(12) United States Patent
Loreskar et al.

(10) Patent No.: US 10,594,493 B2
(45) Date of Patent: Mar. 17, 2020

(54) FUTURE CONSTRAINTS FOR HIERARCHICAL CHAIN OF TRUST

(71) Applicant: TRUSTONIC LIMITED, Cambridge (GB)

(72) Inventors: Chris Loreskar, Haverdal (SE); John Dent, Cambridge (GB)

(73) Assignee: Trustonic Limited, Cambridge (GB)

( * ) Notice: Subject to any disclaimer, the term of this patent is extended or adjusted under 35 U.S.C. 154(b) by 228 days.

(21) Appl. No.: 15/677,337

(22) Filed: Aug. 15, 2017

(65) Prior Publication Data

US 2018/0069707 A1 Mar. 8, 2018

(30) Foreign Application Priority Data

Sep. 6, 2016 (GB) .................................... 1615135.9

(51) Int. Cl.
*H04L 29/06* (2006.01)
*H04L 9/32* (2006.01)
*G06F 21/60* (2013.01)
*H04L 9/14* (2006.01)
(Continued)

(52) U.S. Cl.
CPC .......... *H04L 9/3247* (2013.01); *G06F 21/602* (2013.01); *H04L 9/14* (2013.01); *H04L 9/30* (2013.01); *G06F 8/61* (2013.01)

(58) Field of Classification Search
None
See application file for complete search history.

(56) References Cited

U.S. PATENT DOCUMENTS

| 2002/0040936 A1* | 4/2002 | Wentker ................... G06F 8/60 235/492 |
| 2003/0097578 A1* | 5/2003 | England .................. G06F 21/57 713/191 |
| 2007/0179904 A1 | 8/2007 | Hofstee et al. |

(Continued)

FOREIGN PATENT DOCUMENTS

| EP | 2 814 277 | 12/2014 |
| EP | 2889794 | 7/2015 |

(Continued)

OTHER PUBLICATIONS

Extended European Search Report dated Dec. 14, 2017 in EP Application No. 17183567.1, 6 pages.
Search Report for GB 1615135.9, dated Feb. 14, 2017, 4 pages.

*Primary Examiner* — Taghi T Arani
*Assistant Examiner* — Lin Chang
(74) *Attorney, Agent, or Firm* — Nixon & Vanderhye P.C.

(57) ABSTRACT

A method of configuring a target domain providing a cryptographic identity for authenticating commands to be executed by an electronic device comprises receiving a domain configuration command, and authenticating the command based on a cryptographic identity provided by an authenticating domain which is an ancestor of the target domain in a hierarchical chain of trust. When authenticated, at least one target domain constraint specified by the command is combined with at least one future constraint specified by the authenticating domain to generate a combined constraint set to be satisfied by commands to be authenticated by the target domain. The combined constraint set is stored for the target domain. This approach provides a balance between security and scalability of the chain of trust.

20 Claims, 6 Drawing Sheets

(51) Int. Cl.
*H04L 9/30* (2006.01)
*G06F 8/61* (2018.01)

(56) References Cited

U.S. PATENT DOCUMENTS

| | | | |
|---|---|---|---|
| 2008/0022087 A1* | 1/2008 | Tsujimoto | G06F 21/608 |
| | | | 713/155 |
| 2008/0066159 A1* | 3/2008 | Dillaway | G06F 21/62 |
| | | | 726/4 |
| 2010/0185963 A1* | 7/2010 | Slik | G06F 16/1844 |
| | | | 715/764 |
| 2011/0010543 A1* | 1/2011 | Schmidt | H04W 12/10 |
| | | | 713/168 |
| 2011/0099605 A1* | 4/2011 | Cha | H04W 12/06 |
| | | | 726/3 |
| 2014/0298419 A1* | 10/2014 | Boubez | H04L 63/08 |
| | | | 726/4 |
| 2015/0215281 A1* | 7/2015 | Schmidt | H04L 9/3234 |
| | | | 726/12 |

FOREIGN PATENT DOCUMENTS

| | | |
|---|---|---|
| WO | WO 01/75563 | 10/2001 |
| WO | WO 2005/033868 | 4/2005 |
| WO | 2010/095432 | 8/2010 |

\* cited by examiner

FUTURE CONSTRAINTS FOR HIERARCHICAL CHAIN OF TRUST

This application claims priority to GB Patent Application No. 1615135.9 filed 6 Sep. 2016, the entire contents of which is hereby incorporated by reference.

BACKGROUND

Technical Field

The present technique relates to the field of electronic devices.

Technical Background

Increasingly, electronic devices are being used for processing of potentially sensitive information. For example, it is increasingly common for banking to be carried out using applications running on mobile devices. For a user to be confident that it is safe to use their electronic device for a potentially sensitive application, mechanisms may be provided to establish trust in the applications running on the device. For example, cryptographic techniques may be used to verify the authenticity of the applications and the commands executed by the device in response to those applications, so that a user can be confident that the application they are using came from the authorised source and is not, for example, an unauthorised replica of the application provided by a malicious party.

SUMMARY

At least some examples provide a method for configuring, in an electronic device, a target domain of a hierarchical chain of trust, the target domain providing a cryptographic identity for authenticating commands to be executed by the electronic device, the method comprising:
receiving a domain configuration command requesting configuration of the target domain on the electronic device, the domain configuration command specifying at least one target domain constraint to be satisfied by commands to be authenticated by the target domain;
authenticating the domain configuration command based on a cryptographic identity provided by an authenticating domain, wherein the target domain is the authenticating domain or a descendant domain of the authenticating domain in the hierarchical chain of trust; and
when the domain configuration command is authenticated, combining said at least one target domain constraint and at least one future constraint specified by the authenticating domain to generate a combined constraint set comprising zero, one or more constraints to be satisfied by commands to be authenticated by the target domain, and storing an indication of said combined constraint set.

At least some examples provide a computer program comprising program instructions to control an electronic device to perform the method described above.

The computer program may be stored on a storage medium. The storage medium may be a transitory or non-transitory storage medium.

At least some examples provide an electronic device comprising processing circuitry and storage circuitry storing the computer program described above.

At least some examples provide an electronic device comprising:
authentication circuitry configured to receive a domain configuration command requesting configuration of a target domain of a hierarchical chain of trust on the electronic device, the target domain providing a cryptographic identity for authenticating commands to be executed by the electronic device, the domain configuration command specifying at least one target domain constraint to be satisfied by commands to be authenticated by the target domain, and to authenticate the domain configuration command based on a cryptographic identity provided by an authenticating domain, wherein the target domain is the authenticating domain or a descendant domain of the authenticating domain in the hierarchical chain of trust;
wherein when the domain configuration command is authenticated, the authentication circuitry is configured to combine said at least one target domain constraint and at least one future constraint specified by the authenticating domain to generate a combined constraint set comprising zero, one or more constraints to be satisfied by commands to be authenticated by the target domain, and to store an indication of said combined constraint set.

Further aspects, features and advantages of the present technique will be apparent from the following description of examples, which is to be read in conjunction with the accompanying drawings.

DESCRIPTION OF EXAMPLES

As discussed below, the present technique allows an authenticating domain within a hierarchical chain of trust to specify future constraints to be satisfied by commands to be authenticated by a target domain in the chain of trust. When the authenticating domain authenticates a domain configuration command for configuring a target domain (which is the authenticating domain itself or a descendant domain of the authenticating domain), then the specified future constraint is combined with at least one target domain constraint specified in the domain configuration command, to generate a combined constraint set comprising zero, one or more constraints to be satisfied by the commands to be authenticated by the target domain. An indication of a combined constraint set is then stored for the target domain. Subsequently received commands to be authenticated by the target domain may then be subject to the combined constraint set.

This approach allows an authenticating domain at a higher level of the chain of trust to have influence over the criteria used by a descendant domain to authenticate commands, while also permitting the descendant domain to introduce its own constraints which have not been explicitly set by the authenticating domain. By combining the constraints specified for a given target domain with future constraints in this way, this allows for the flexibility of using a delegated chain of trust where the top level domain does not need to be aware of all criteria being used at lower levels of the chain of trust, but with increased security as the higher levels can still influence the way in which commands are authenticated lower down in the hierarchy, so that lower domains do not have complete freedom to authenticate messages or commands in any way they choose.

Figure 1:
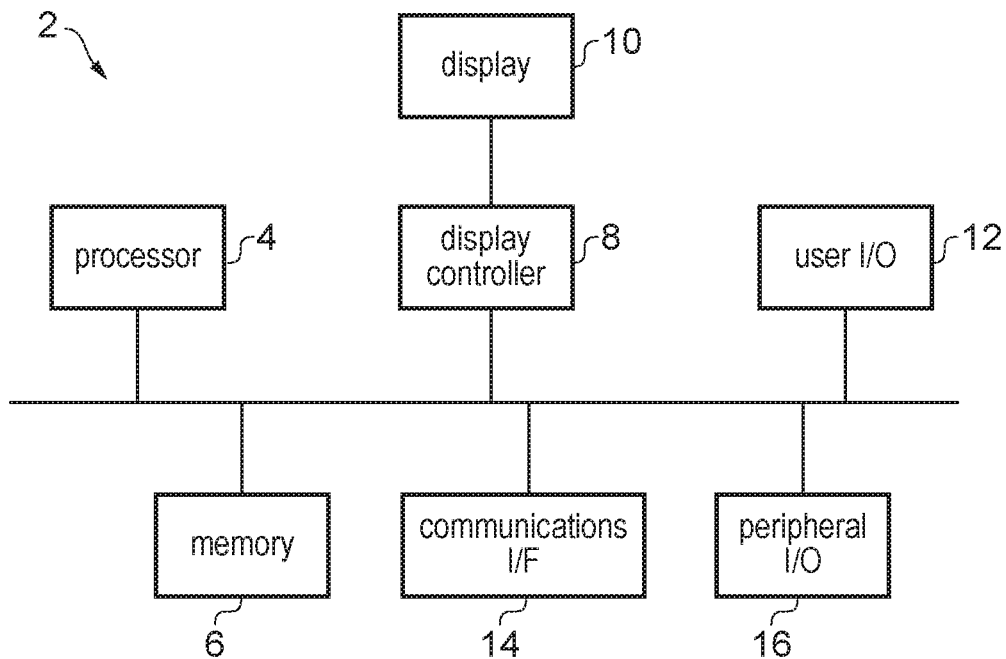
FIG. 1 schematically illustrates a simplified example of an electronic device.

FIG. 1 schematically illustrates an example of an electronic device 2 which comprises a processor 4, memory 6, display controller 8 and display 10, user input/output circuit 12 for accepting user input (e.g. a keypad or touch screen), communications interface 14 for communicating with other devices, and a peripheral input/output circuit 16 for communicating with other peripheral devices, such as a memory card providing further data storage or fingerprint sensor for detecting fingerprints. In operation, the processor 4 executes computer program instructions that may be stored in the memory 6, an external data storage unit or dynamically downloaded via the communications interface 14. The results of the processing performed may be displayed to a user via the display controller 8 and display 10. User inputs for controlling the operation of the electronic device 2 may be received via the user input/output circuit 12. It will be appreciated that the computer program could be written in a variety of different computer languages. The computer program may be stored and distributed on a recording medium or dynamically downloaded to the device via the communications interface 14. It will be appreciated that this is a simplified example of some components of an electronic device, and the architecture of the device may vary considerably, and the electronic device may have other elements not shown in FIG. 1 for conciseness. The electronic device could be any of a wide variety of types of device, including for example a desktop or laptop computer, a mobile device such as a mobile cellular telephone or tablet computer, or an embedded device within an appliance such as a television, washing machine or refrigerator for example. Hence, the present technique is not restricted as to the type of electronic device in which the cryptographic techniques for establishing trust are implemented.

Figure 2:
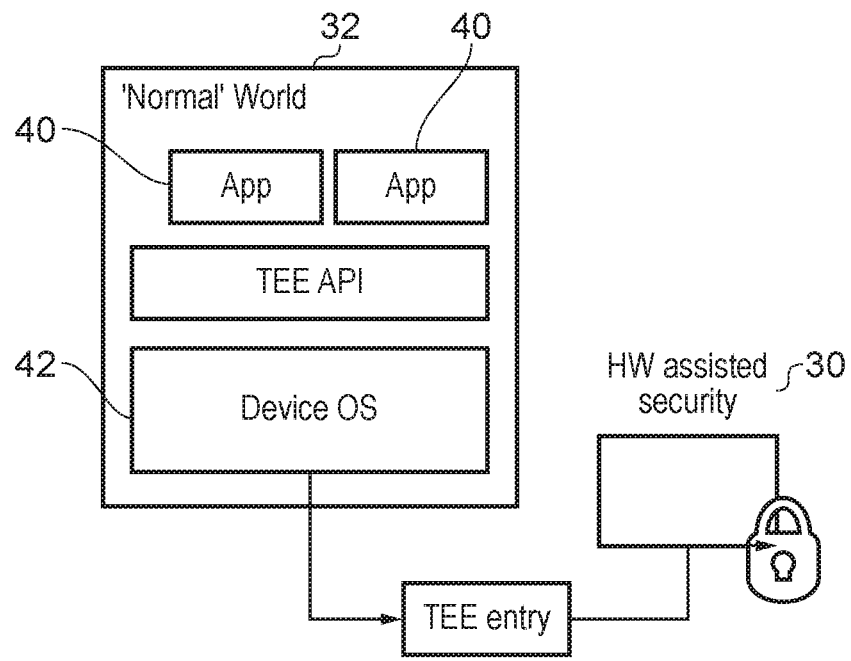
FIG. 2 shows an example of normal and secure runtime environments which may be implemented on the electronic device.

In some examples, to increase security, the electronic device 2 may have a hardware architecture which supports operation of a secure runtime environment 30 in addition to a normal runtime environment 32, as shown in FIG. 2. Secure data may be processed using trusted applications 36 and/or a secure operating system executing under the secure run time environment 30. Hardware mechanisms may be provided to ensure that applications 40 or an operating system 42 running in the normal runtime environment 32 cannot access secure data or code associated with the secure runtime environment 30. For example, a memory management unit or similar structure can be used to partition the memory address space into secure and normal regions, and prevent access to the secure regions by code executing in the normal runtime environment 32. There are a number of options for policing access to the secure runtime environment 30. In one example, transitions between the normal and secure runtime environments may be policed by secure monitor code 46 which may permit transitions in a limited set of circumstances. For example, an exception mechanism may be used to trigger transitions between the runtime environments via the monitor code, which can check whether the application requesting access to the secure runtime environment is allowed to do so. Alternatively, rather than using software to police the transitions, the hardware architecture could permit branching between the normal and secure runtime environments 30, 32 directly, but hardware mechanisms may be provided to ensure safe transitions, such as requiring that the non-secure code only branches to secure code at certain predetermined entry points. For example, a given application may then branch to a function in the secure domain for carrying some security-sensitive functionality such as password checking, before branching back to the normal world 32 at the end of the function. An example of a hardware architecture providing such a secure runtime environment 13 may be the Trustzone® architecture provided by ARM® Limited of Cambridge, UK, although other examples are also available. Hence, if a secure runtime environment is implemented on the device 2, then this can provide greater protection for sensitive data or code running on the electronic device. Nevertheless, the present technique can also be applied to devices not having such a secure runtime environment implemented in the hardware architecture of the device 2.

Figure 3:
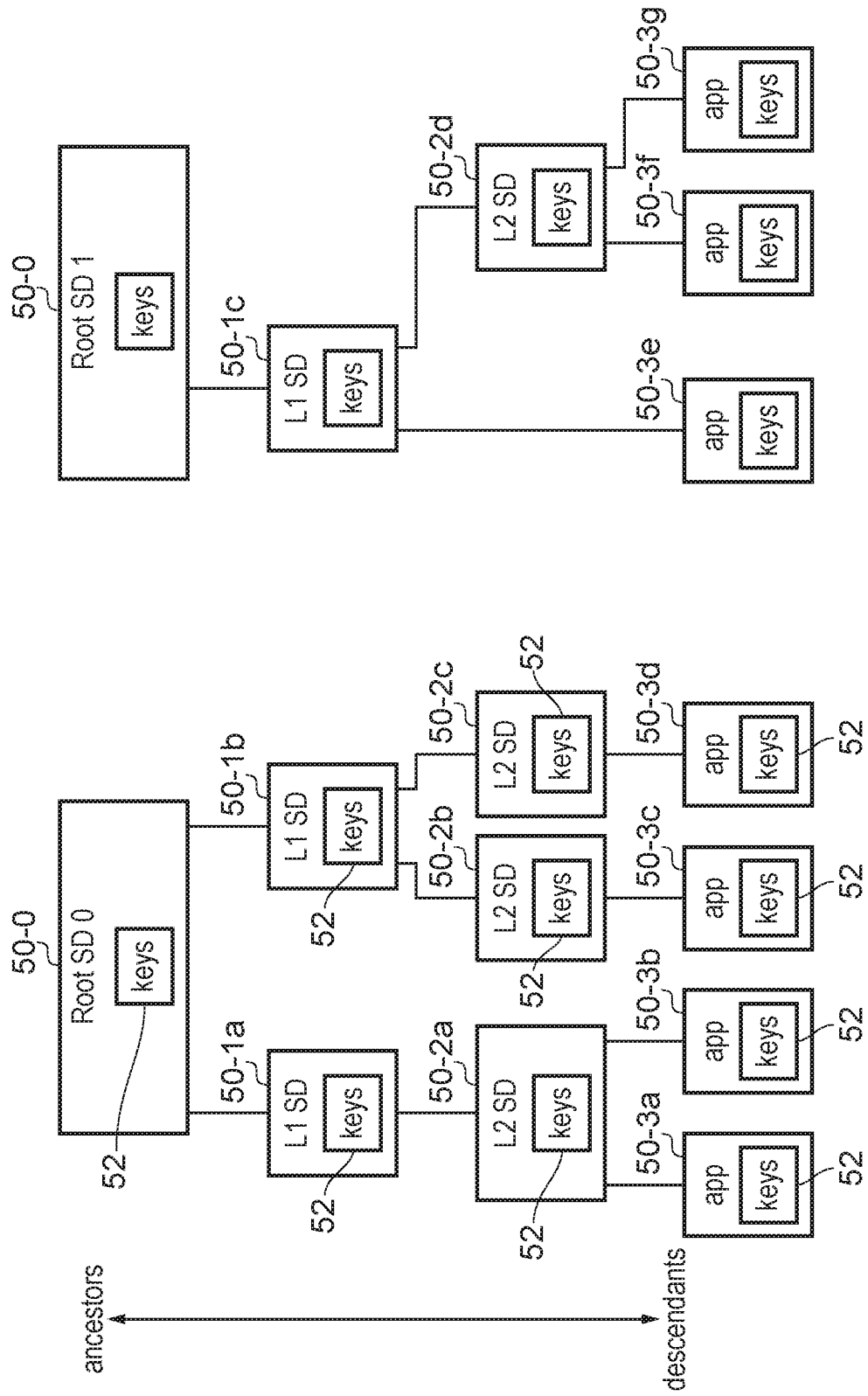
FIG. 3 shows an example of a hierarchical chain of trust providing a number of domains for providing respective cryptographic identities for authenticating commands to be executed by the electronic device.

FIG. 3 shows an example of a hierarchical chain of trust which may be implemented on the electronic device. In order to verify that commands issued by a given application or other process running on the electronic device come from an authorised source, at least one cryptographic identity may be established for authenticating the commands to be executed by the electronic device. For example, the cryptographic identity may be represented by one or more cryptographic keys, signatures or certificates. For example, commands to be executed may be signed using a given key and the signature associated with the command may be verified by decrypting the signature using a corresponding key. For example a public-private key infrastructure may be used. If the signature associated with a given command is verified as being authentic, then it can be trusted that the command has come from the expected source and can be acted on by the electronic device. On the other hand, if a hacker or other malicious party attempts to inject commands to fool the device into thinking they come from some other source but do not have the appropriate keys for verifying their cryptographic identity, then the commands will not be authenticated and will not be acted upon. This approach can be used for protecting sensitive applications such as mobile banking applications, electronic identification applications (e.g. electronic passports or the like), secure payment applications, and so on.

The trust established by a given cryptographic identity may derive ultimately from a particular certifying authority, who could be a manufacturer of the electronic device itself, a party supplying secure software for setting up the infrastructure for checking the cryptographic identity associated with the commands to be executed and verifying their authenticity, or an entirely independent body responsible for authorising other parties applications for example. Hence, one approach for maintaining trust in the applications running on the electronic device could be that the certifying authority sets up cryptographic identities for each of the applications which could be installed on the device and is responsible for configuring the device with information defining the criteria to be used for all signing and authenticating operations associated with any command to be executed by an application. However, in practice the number of applications that could potentially need authentication is vast, and one certifying authority may simply not have enough resources for verifying all applications, including specifying the criteria to be applied for commands from any given application to be authenticated. Hence, this approach with a single agent establishing the cryptographic identity for all applications does not scale in practice.

The hierarchical chain or trust shown in FIG. 3 provides a way for the certifying authority acting as the root of the trust to delegate signing or authentication functions to other parties. The root authority can authorise another party to authenticate commands on its behalf, by establishing a cryptographic identity for that other party and providing means within the electronic device for verifying that commands purporting to come from that other party actually did come from that party. The other party to which the root authority delegated trusted operations may then itself delegate further operations to another party for authenticating messages on its behalf, again with a corresponding cryptographic identity being established for that other party. This may continue so that, as shown in FIG. 3, the hierarchical chain of trust may include a number of domains 50 each providing a cryptographic identity for authenticating commands to be executed by the electronic device, where each domain 50 which is not the root domain 50-0 has been configured based on commands authenticated by a parent domain. For example, in FIG. 3 the root domain 50-0 in the left hand chain of trust has authorised the configuration of two level 1 domains 50-1, which themselves have authorised the configuration of a number of level 2 domains 50-2, which have themselves authorised the configuration of a number of application-level domains 50-3. Each domain is represented in the electronic device by a stored set of cryptographic information 52 such as cryptographic keys or certificates, for representing the cryptographic identity to be used for checking whether commands should be authenticated by that domain. Each domain may also have defined a set of constraints to be imposed on commands to be authenticated, as will be discussed in more detail below.

Hence, if a command issued by a given software process executing on the device 2 or by an external device is authenticated as trusted by a given application-level domain (domain 50-3c for example), then since that application-level domain was verified as authentic by its parent domain (a level 2 domain 50-2b in this example), the level 2 domain 50-2b was itself authenticated as trusted by a level 1 domain 50-1b, and the level 1 domain 50-1b was authenticated by the root domain 50-0, then implicitly the command authenticated by the application-level domain 50-3c has also been authenticated by the root domain 50-0 itself. Note that at the time of processing the command from the application, it is sufficient to authenticate the command using the cryptographic identity associated with the application-level domain 50-3c (the other authentications in the chain of trust having already been performed when the ancestor domains were configured, so that it is not necessary to repeat these each time a command is received). Such a delegated chain of trust means that the root domain itself does not need to take responsibility for defining the criteria for authenticating all commands to be executed by the device, but may delegate such responsibility to other parties.

In general, a given domain in the chain of trust may have one or more "ancestor domains" which are the domains which have authorised the configuration of that given domain, either directly or implicitly through one or more intervening ancestor domains. On the other hand, a given domain may have one or more "descendant domains", which are domains whose configuration was authorised by that given domain either directly or implicitly through the authorisation of one or more intervening descendant domains. The "parent domain" of a given domain refers to the domain which authorised the installation of the given domain, while a "child domain" of a given domain is a domain which was authorised to be installed by that given domain.

As shown in FIG. 3, several independent hierarchical chains of trust may be provided on the same electronic device. For example, multiple different certifying authorities may configure separate root domains on the same device. Also, as shown in FIG. 3, not all branches of a given hierarchy need to have the same number of levels. For example, as shown in the right hand chain, one application-level domain 50-3e may be installed directly under a level 1 domain 50-1c, while other application-level domains 50-3a, 50-3b, . . . , 50-3g may be children of a level 2 domain 50-2. The particular numbers of levels provided in the different branches of the tree may depend on the particular parties to which trust is delegated. For example, the root domain may be configured by information set by a certifying authority or a provider of the secure software implementing the infrastructure for the cryptographic processing being used. The level 1 domains 50-1 may be configured based on information set by a trusted application manager, who may be one of a number of parties to which the certifying authority has directly delegated trust signing operations. The level 2 domains 50-2 may be implemented by service providers such as a provider of an application store, a bank or other company wishing to provide a number of secure applications, or any other party. The application-level domains 50-3 may be installed under control of the developers of particular applications running on the electronic device. Although the trusted application manager could generally authorise further service providers to install level 2 domains, they may occasionally also support their own applications in which case the level 1 domain 50-1 could install an application-level domain directly without first installing a level 2 domain 50-2.

It will be appreciated that the domains 50 shown in FIG. 3 need not necessarily correspond to actual software processes executing on the device. Although the application level domains 50-3 would typically correspond to certain applications, their ancestor domains need not have any particular software associated with them on the device. Instead they may merely provide a cryptographic identity for authenticating commands to be executed by the device. The actual software running on the device for controlling the authentication process may be a common program used for all levels of the chain of trust, for example a program provided by the root domain certifying authority itself, which may then verify the authenticity of commands according to different constraints and different cryptographic identities depending on the particular target level of the chain of trust at which that command is to be authenticated.

Hence, providing a delegated chain of trust has the advantage that this allows a much larger variety of applications to be authenticated as trusted than could be supported by one certifying authority themselves. However, having authorised a particular party to act as a certifying agent at a given level of the chain of trust, including specifying the constraints to be applied for messages to be authenticated by that party's domain, this may open a security loophole where a party once authorised to certify commands within the chain of trust could then allow other commands to be accepted which the party associated with the ancestor domain may not consider appropriate. For example, a cryptographic algorithm used by a later domain may subsequently be found to include a security loophole, but if the ancestor domains have delegated all responsibility for controlling the criteria to be applied by later descendant domains to the descendant domains themselves, then this may not allow them to adequately close off the loophole, to ensure that the secure applications running on the device are trusted. Hence, in practice neither a fully unified mechanism for one party to take complete responsibility for establishing the cryptographic means for authenticating commands, nor a fully delegated approach where descendant domains in the chain of trust have complete control over the criteria they apply to authentication messages, provides an appropriate balance between security and scalability.

Instead, a mechanism is described herein for allowing the ancestor domain to have some influence over the constraints applied to messages by a descendant domain, while also enabling the descendant domain itself to specify constraints which the ancestor domain was not aware of.

Figure 4:
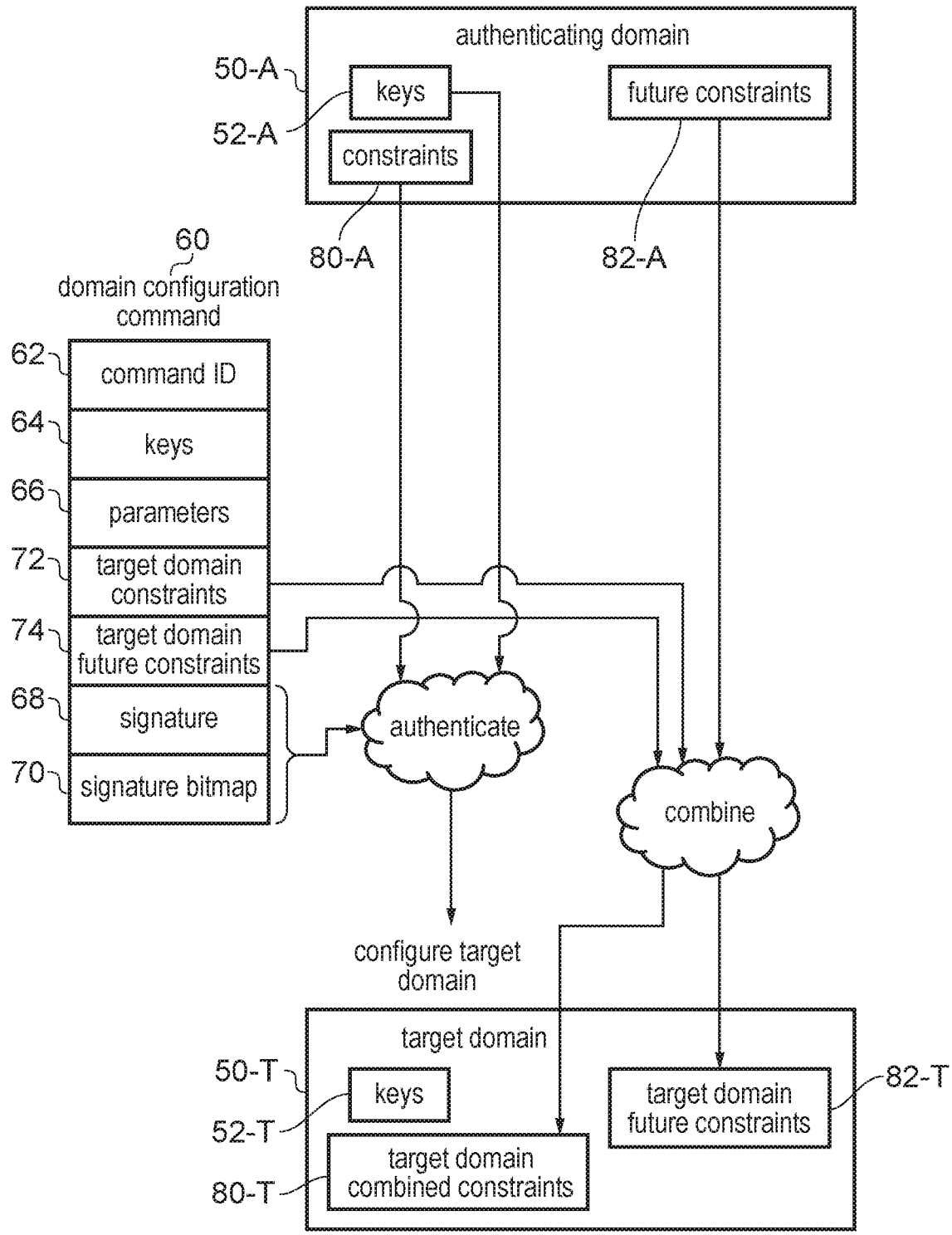
FIG. 4 shows an example of configuring a target domain of the chain of trust based on future constraints set by an authenticating domain.

FIG. 4 shows an example of injecting additional constraints when configuring a certain target domain 50 in the hierarchy of trust. A domain configuration command 60 is received by the device 2, for example from an application or other software process running on the device, or from an external source such as another device (e.g. a server) with which the electronic device is communicating via the communication interface 14. The domain configuration command 60 is a command requesting configuration of a certain target domain 50-T in the hierarchical chain of trust, which could be any of the domains 50 shown in FIG. 3, other than the root domain 50-0 (although domain configuration commands can also be received for configuring the root domain itself, in this case the future constraint mechanism shown in FIG. 4 would not be applied since there is no ancestor domain to influence the configuration of the root domain). The domain configuration command 60 could be a domain install command for requesting installation of a completely new domain in the hierarchy, or a domain update command for requesting that certain parameters of an existing domain 50 are updated.

As shown in FIG. 4, the domain configuration command 60 may include various fields, e.g. a command identifier field 62 identifying the type of command (e.g. whether it is a domain install command or a domain update command), cryptographic keys 64 to be stored in the electronic device for the target domain, other parameters 66 of the command, such as an indication of which other domain is to act as the authenticating domain for this command, or any other information required for processing of the command or for configuring the target domain, and a digital signature 68, which has been generated by signing the command with a key for verifying that the command has come from the party having the relevant cryptographic identity. Optionally, the command may also include a signature bitmap 70 which provides metadata identifying which other parts of the command 60 are verified as authentic by the signature 68. Although not essential, some protocols allow for only some parts of a message to be authenticated by the signature, which means that non-protected parts of the command can be modified by parties intercepting the command without affecting the validity of the signature 68. For example, the signature 68 may have been generated by a hash of the protected parts of the command as indicated by the signature bitmap 70 and so the non-protected parts can vary without effecting whether the signature 68 is correct. Other examples could use other formats to represent the signature metadata for identifying which portions of the command are authenticated by the signature (using a bitmap is not essential).

The command 60 also specifies a list of zero, one or more target domain constraints 72 to be applied to messages to be authenticated by the target domain, and a target domain future constraint list 74 specifying zero, one or more future constraints to be imposed on descendant domains of the target domain.

The domain configuration command 60 is authenticated by an authenticating domain 50-A. Which domain acts as authenticating domain could be identified by the command 60 itself, or could be implicit (e.g. based on the source which issued the command or on which domain is the target domain 50-T for example). For example, in some systems it may only be allowed for a given domain to be configured based on commands authenticated by its immediate parent domain, i.e. the domain which initially installed that target domain. In this case, there may be no need to separately specify both the target domain 50-T and the authenticating domain 50-A. On the other hand, other systems may permit any ancestor of a given domain to configure that domain, so the authentication domain 50-A could be a higher domain in the chain of trust than the target domain's immediate parent. While for the installation of a new domain, the install command would be authenticated by that domain's parent domain by definition, for updating of existing domains the authentication could be performed by any ancestor domain of the target domain. In practice given that the very purpose of establishing the delegated chain of trust is to remove responsibility from higher levels, it will be often be the case that a given domain is configured by its immediate parent, but nevertheless it is still possible to configure a domain from a higher level if desired.

As shown in FIG. 4, the authenticating domain 50-A may have a number of control parameters stored for it in the memory 6 of the electronic device 2. For example if a secure runtime environment is provided then this may be stored as part of the secure data 34 in the secure region of the memory address space. The control parameters may include keys 52 associated with the authenticating domain, one or more constraints 80-A to be imposed on commands to be authenticated by the authenticating domain 50-A itself, as well as one or more future constraints 82-A which are to be used for commands authenticated by at least one descendant domain of the authenticating domain 50-A.

Hence, when the domain configuration command 60 is received, the command is authenticated by the authenticating domain 50-A based on its stored keys 52-A and the applied constraints 80-A. For example, the parts of the command 60 indicated as protected by the signature bitmap 70 may be used to generate a hash of the command 60, the signature 68 may be decrypted using the stored keys 52-A and then the decrypted signature may be compared against the generated hash to verify whether the message is authentic. In addition, any other criteria for authentication of the command specified by the constraints 80-A of the authentication domain may be checked, and the command may be authenticated only if both the cryptographic identity has been verified using the keys 52-A and the other constraints 80-A are satisfied. For example, the constraints 80-A could specify that the command must have been signed with a certain cryptographic algorithm, or that a certain key identifier or key size should be used, or that a certain padding algorithm must have been used for the command, or may specify a maximum size for the command 60, a frequency with which the command 60 can be authenticated (e.g. the command may only be received N times within a given period and subsequent instances of the command may be rejected until the end of the period), and so on. It will be appreciated that there are a wide variety of conditions which could be imposed on the command in order to be authenticated, depending on the particular needs of a given party or type of command. In general, the term "constraint" may refer to any requirement to be satisfied by a command in order to be authenticated. If the command is authenticated then the target domain is configured in response to the command, e.g. installed or updated. For example the new keys 64 specified by the domain configuration command 60 may be installed as the keys 52-T of the target domain, other parameters 66 specified by the command may be used to update properties of the target domain, and so on.

When the domain configuration command is authenticated, then the target domain constraint 72 specified in the command 60 may be combined with the future constraints 82-A specified by the authenticating domain 50-A, to generate a combined set of target domain constraints 80-T which are then stored in the electronic device. The target domain's combined set of constraints 80-T would then be applied when authenticating any subsequent messages being authenticated by the target domain. Hence, the constraints applied by the target domain 50-T depend not only on the constraints specified in the domain configuration command 60 (which can be chosen by the party operating the target domain), but also depend on the future constraints 82-A which have been set when the authenticating domain 50-A was configured, which could be controlled by a completely different party. Similarly, the target domain's future constraints 74 specified in the command 60 may be combined with at least some of the future constraints 82-A set by the authenticating domain 50-A, and these may then be stored as a combined set of target domain future constraints 82-T associated with the target domain 50-T. While the target domain's combined constraints 80-T represent the constraints to be applied to the messages to be authenticated by the target domain itself, the target domain's future constraints 82-T represent constraints which are to be imposed on at least one descendant of the target domain. If the target domain 50-T later acts as an authenticating domain for a subsequent domain configuration command then its future constraints 82-T can be combined with constraints specified by the domain configuration command in a similar way to the way shown in FIG. 4. That is, the target domain 50-T would then act as the authenticating domain 50-A for a subsequent domain configuration command. The authentication and combinations processed shown in FIG. 4 may be controlled by secure software running on the processor.

Figure 5:
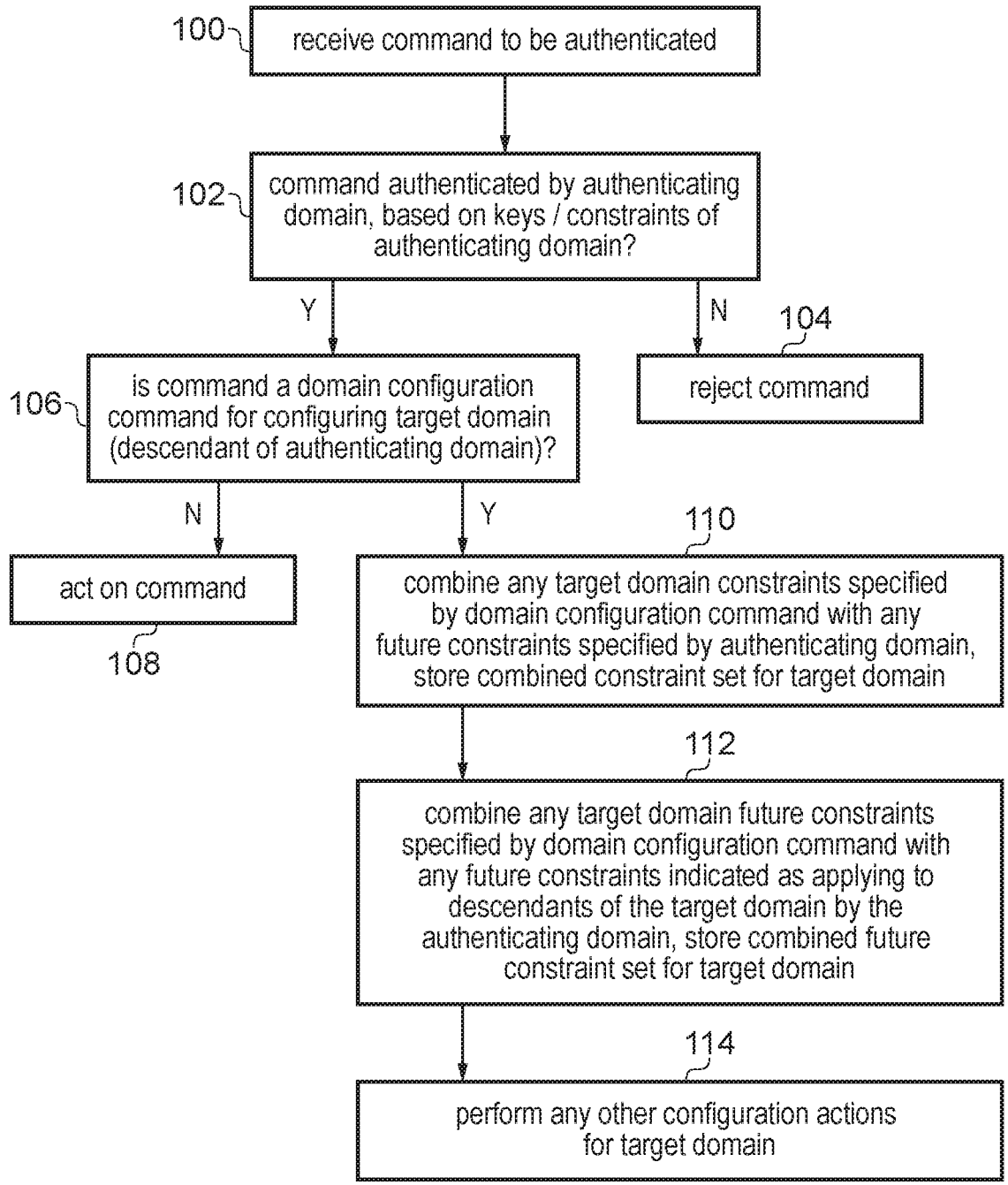
FIG. 5 shows a flow diagram illustrating a method of authenticating commands, including a case where a domain configuration command is authenticated.

FIG. 5 shows a flow diagram summarising these techniques. At step 100 a command to be authenticated is received. At step 102, an authenticating domain 50-A in the hierarchical chain of trust determines whether the command is authenticated. The authenticating domain could be explicitly identified by the command itself or could be implicit from the type of command, e.g. commands associated with a given application could implicitly need to be authenticated by the corresponding application level domain 50-3. The authenticating domain checks the command against cryptographic information such as keys or certificates establishing a cryptographic identity of a verified party, and also checks whether its constraints 80-A are satisfied by the command. If either the cryptographic identity of the party issuing the command has not been verified or the constraints were not satisfied then at step 104 the command is rejected and is not acted upon. A rejected command could simply be ignored, or alternatively other actions may be performed, such as triggering an exception or an error message.

If the command is authenticated, then at step 106 it is determined whether the command is a domain configuration demand for configuring a target domain 50-T which is a descendant of the authenticating domain 50-A. The target domain could be an immediate child domain of the authenticating domain or a grandchild or other descendant in the case of a domain updating command. If the command is not a domain configuration command then at step 108 the command is acted upon according to whatever function is represented by the command.

If the command is a domain configuration command then at step 110 any target domain constraints 72 specified by the domain configuration command are combined with any future constraints 82-A specified by the authenticating domain 50-A, and the combined constraint set 80-T is then stored in the memory 6 as part of the configuration parameters for the target domain 50-T. Similarly, at step 112 any target domain future constraint 74 specified by the command 60 is combined with any future constraints 82-A indicated as applying to descendants of the target domain by the authenticating domain 50-A, and the combined future constraint set is then stored for the target domain 50-T. That is, not all of the future constraints 82-A specified by the authenticating domain 50-A need apply to all descendants of the authenticating domain. Some of these constraints could only apply to the authenticating domain's immediate child domain, but need not be passed on to further descendants. Other future constraints indicated as applying to further descendants could be combined at step 112. At step 114 any other configuration actions associated with the configuration of the target domain are performed. For example this may include updating the keys 52-T associated with the target domain.

In the example above, at step 110 the combined constraint set is stored in the memory 6 of the electronic device 2 itself. However, in an alternative embodiment, the indication of the combined set of constraints could be stored elsewhere in a separate device. For example, the combined constraint set could be stored remotely on a server and fetched each time a command is processed.

Figure 6:
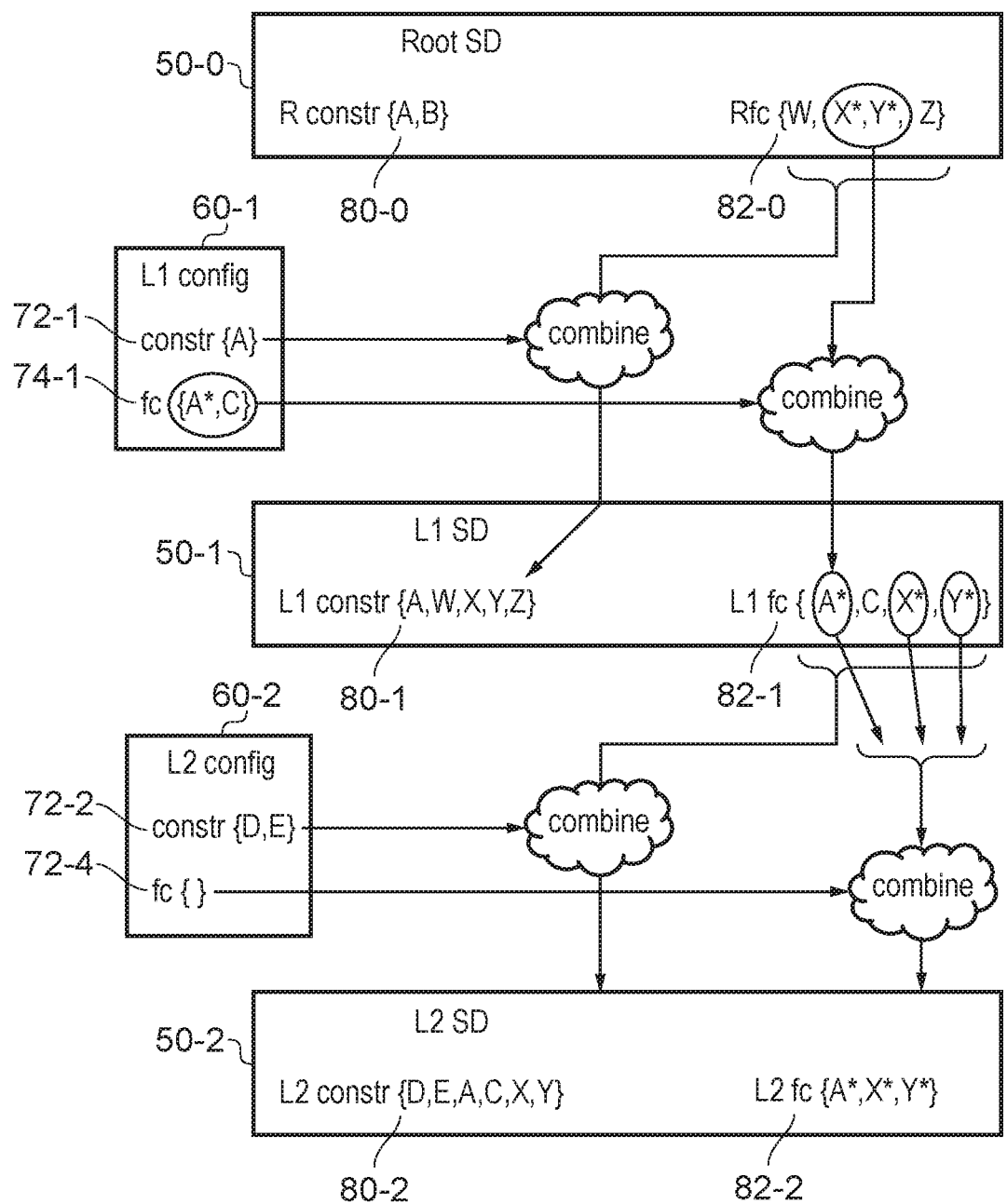
FIG. 6 illustrates an example of different sets of constraints and future constraints applied for respective levels of the chain of trust.

Hence, as shown in FIG. 6, different domains in the tree of trust may end up with different sets of constraints 80 to be applied to messages being authenticated at that level of the tree, as well as different sets of future constraints to be imposed on subsequent levels. For example, as shown in FIG. 6 the root domain 50-0 may for example specify two constraints A and B to be satisfied by the messages authenticated by the root domain, as well as a number of future constraints W, X, Y, Z to be imposed on descendants of the root domain. Of these future constraints, X and Y are indicated as to be imposed on all descendants of the root (this is indicated by the asterisks in FIG. 6—in a hardware device a bit flag or other indication may be set to identify which constraints apply to all descendants), while constraints W and Z apply only to the immediate children of the root domain 50-0.

A configuration command is then received to configure a level 1 domain 50-1 which is a child of the root domain 50-0. The level one configuration command specifies constraint A as a target domain constraint 72-1 and also specifies constraints A and C as future constraints 74-1, with A indicated as applying to all descendants of the level 1 domain. Hence, on configuration of the level 1 domain, the level 1 constraint 72-1 is combined with the future constraints 82-0 specified by the root domain to give a combined constraint set 80-1 including constraints A, W, X, Y, Z. Also, the future constraints 74-1 of the command are combined with those constraints X, Y in the root domain's future constraint set 82-0 which are indicated as applying to descendants of the level 1 domain, to give a combined future constraint set 82-1 comprising constraints A, C, X, Y. As constraint C was indicated in the configuration command as applying only to the immediately subsequent child domain, it is not indicated with an asterisk while the others are.

Similarly, on receipt of another level 2 configuration command 60-2 for configuring a level 2 domain 50-2 under authorisation of the level 1 domain 50-1, further combinations are made to set the constraint set 80-2 and the future constraint set 82-2 for the level 2 domain 50-2. Note that not all commands need specify future constraints 74. For example, in the case of FIG. 6 the level 2 configuration command 60-2 did not include a future constraint list (or specified an empty future constraint set) and so in this case the future constraint set 82-2 of the level 2 domain is derived solely from the future constraints specified by the level 1 domain. Similarly, some configuration commands might not specify any target domain constraint 72 in which case the combination with the future constraints from the earlier domain could result in a combined set which only includes constraints specified by the future constraint set of the authorising domain. Hence, while the method of the present technique supports the combination of the constraints 72 from the command 60 with the future constraints 82 specified by the authenticating domain, it is not essential to do this combination on every domain configuration command.

Hence, as shown in FIG. 6, the same type of command could be subject to different constraints depending on the level of the chain of trust at which it is authenticated. For example, although a command could be rejected at the level 2 domain 50-2 for not satisfying constraint D, at the level 1 domain 50-1 the same command could be authenticated if it satisfies constraints A, W, X, Y, Z. Likewise a command rejected at level 1 could be approved at level 2 for example.

In the example of FIG. 6, when combining future constraints 82 from the authenticating domain with constraints 72 or future constraints 74 specified by the domain configuration command 60, an OR combination is made so that the combined set of constraints or future constraints include a given constraint if it is specified by either one of the target domain's constraint set 72 or the authenticating domain's future constraint set 82. However, as shown in FIG. 7 this is not the only option for combining sets of constraints and other functions could also be used.

Figure 7:
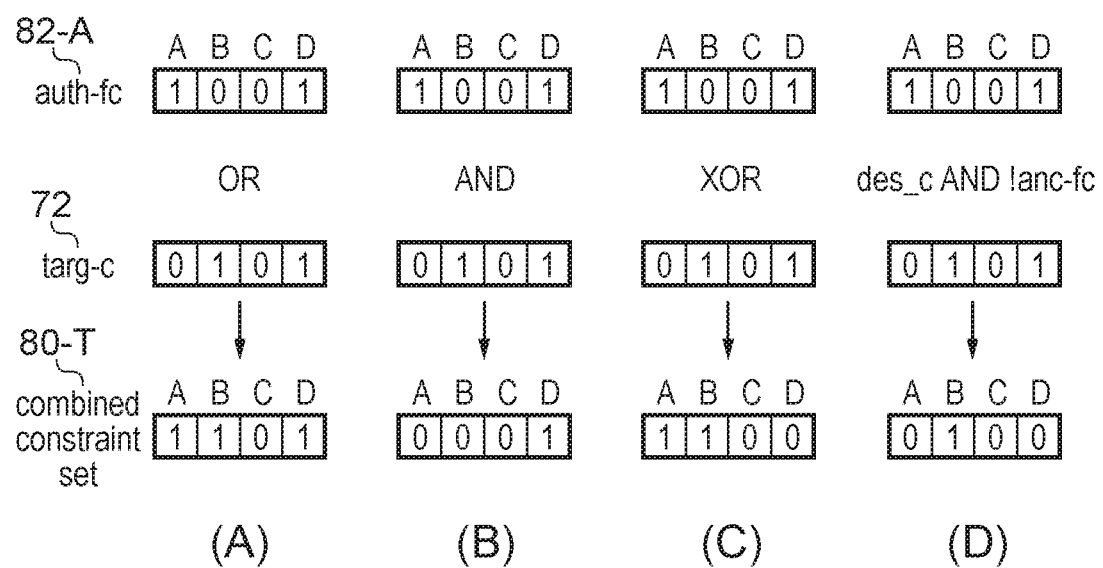
FIG. 7 schematically illustrates four examples of different rules for combining the future constraints specified by the authenticating domain and constraints specified in the domain configuration command for a target domain.

FIG. 7 shows four examples where for conciseness a simplified set of four constraints ABCD is considered, and bitmaps are provided indicating whether each of those constraints are specified within the future constraint set 82-A specified by the stored configuration information for the authenticating domain 50-A and the target domain's constraint set 72 specified by the domain configuration command 60. A '1' in the bitmap indicates that the corresponding constraint is specified by the relevant constraint set, while a '0' indicates that the constraint is not specified. The four examples are as follows:

a) In this example the OR combination shown in FIG. 6 is shown. With this approach, if a given type of constraint is specified by either one or both of the sets of constraints 82-A, 72 being combined, then the combined constraint set will also include that type of constraint. Hence, this approach allows a party configuring an authenticating domain to specify additional constraints which are to be injected into the constraint set of a descendant domain, alongside any other constraints which are specified by the target domain itself.

b) This example combines the respective sets of constraints using an AND operation, which means that a given type of constraint forms part of the combined constraint set if it is specified by both the future constraint set 82-A and the target domain constraint set 72. This approach can be useful for allowing the authenticating domain to restrict which types of restraints can be imposed by a target domain. That is, the AND combination essentially ensures that only the constraints specified in the future constraint set can be included in the combined constraint set, but the target domain will still have the flexibility of setting which of these particular constraints will be imposed (the authenticating domain is not enforcing that any of these domains must be imposed, but defines which ones are allowed to be set by the target domain).

c) The respective sets of constraints could be combined using an XOR operation, so that only the non-intersecting constraints which appear exclusively in one of the future constraint set 82-A and the target domain's constraint set 72 will form part of the combined set. Hence, constraints which appear in both sets 82-A, 72 are eliminated from the combined set 80-T.

d) In this approach, a given type of constraint forms part of the combined constraint set 80-T if it is specified by the target domain's constraint set 72 but is not specified by the future constraint set 82-A. For example this can be achieved by combining the target domain constraint bitmap 72 with the negation of the future constraint bitmap 82-A (NOT) using a bitwise AND operation. With this approach, the future constraint set effectively specifies those constraints which must not be applied by the target domain, since any constraints specified in the future constraint set will then be removed from the combined constraint set if it is specified by the target constraint set. Hence this approach may effectively define negative future constraints defining constraints which should not be imposed by a descendant domain.

Depending on the particular rule being used for combining the future constraint set and the constraints specified in the configuration command for the target domain, it will be seen that in some cases the combined constraint set 80-T may end up including no constraints at all. For example if the AND operation is used and none of the constraints applied by the target domain intersected with constraints specified in the future constraint specified by the authenticating domain, then the combined set would include zero constraints. Hence, sometimes no additional constraints may be applied for a given domain, other than that the cryptographic identity of the party providing the command is to be verified using the keys or other cryptographic material.

While FIG. 7 shows the different combination rules for combining the future constraints 82-A with the target domain constraint 72, similar options may be available when combining future constraints 82-A with the target domain's future constraints 74 to generate the combined set of future constraints 82-T.

Also, while the four examples shown in FIG. 7 are shown separately, it will be appreciated that in practice the authenticating domain may use a combination of these for different types of constraints. For example, some types of constraints may be combined with an OR function, while other types of constraints may use one of the alternatives of examples (b) to (d) discussed above. Hence, in some cases the future constraint information 82 specified for a given domain may include information specifying what particular rule is to be used for combining the future constraints with the constraints set by the target domain being configured, and different rules may be set for different types of constraints. This rule defining data could be specified by the domain configuration command 60 configuring the authenticating domain 80-A.

In some cases, the injection of future constraints may be limited to certain levels of the chain of trust. For example, in some cases the root domain 80-0 may have the ability to define future constraints to be imposed on subsequent levels of the chain of trust, but other levels may not be allowed to introduce additional future constraints—in this the configuration commands for configuring the subsequent levels would include the constraints 72 to be applied at that level, but would not include any further future constraints 72, and the future constraint sets 82-T defined for the subsequent level domains would be based solely on the future constraints 82-0 set for the root domain. Alternatively, other examples may allow other domains in the chain of trust to introduce their own future constraints, so that the general constraint injection mechanism illustrated in FIG. 4 can apply at more than one level of the chain of trust.

Some examples of the types of constraints which could be set as future constraints for a given authenticating domain, or as constraints 72 for a given target domain, are discussed below.

In one example, the future constraint could be a level-specific constraint which is to be satisfied by commands to be authenticated by a domain at one or more predetermined levels of the hierarchical chain of trust. For example, the constraint could be associated with a parameter specifying which levels of the tree those constraints should apply (e.g. level 1 only, or level 1 and level 2). For example, some restrictions may be targeted at the application level, or only at the level one representing the immediate children of the root domain.

On the other hand, other constraints could be universal and apply to all descendants of the authenticating domain. For example, these could be the constraints marked with asterisks in the example of FIG. 6, which progress through the future constraint sets of each subsequent domain configured within the same branch of the tree. Hence, some constraints may be descendant constraints which are to be satisfied by commands to be authenticated by the target domain itself as well as any descendant domain of the target domain in the chain of trust.

For example, in order to ensure that a certain cryptographic algorithm is processed securely, a given domain may require that domains below it apply some condition, for example that the signature bitmap 70 of the command 60 should indicate that the entire command 60 is protected by the signature 68 in order to be authenticated. This signature enforcing constraint can be useful to close off loopholes which could allow a party to modify some parts of the command without the signature 68 being invalidated. A given party may wish to prevent this loophole and so by specifying such a signature enforcing constraint, this ensures greater security (particularly if this future constraint is marked as a descendant constraint which applies to all descendants of the domain setting the future constraint).

A future constraint could also be marked as a type-specific constraint which is to be satisfied for one or more predetermined types of command to be authenticated by the target domain or a descendant domain of the target domain. For example the constraint may only apply to a domain installation command or another type of command. Hence, for such constraints then the authentication process may involve checking the command ID 62 and if it is one of a set of predetermined values to which the constraint applies, then the constraint itself is checked while otherwise the type-specific constraint may be ignored.

One example of a type-specific constraint may apply to domain install commands for installing a new domain of the hierarchical chain of trust on the electronic device. The constraint may be a blocking constraint which specifies that the new domain has to be installed in a blocked state in which it cannot yet authenticate commands, otherwise the domain install command will be rejected. Unblocking of the newly installed domain, so that it can now continue in an unblocked state in which it is allowed to authenticate commands, may require a further unblocking command to be received. Authentication of the unblocking command could require some constraint which does not have to be satisfied by the installing command itself. For example, the unblocking command could have to specify some other cryptographic information, for example verifying that the unblocking command has been authorised by another party other than the party providing the install command itself, or providing some secret identifier which authorises the unblocking command for the electronic device. For example, the unblocking command could be subject to an unblocking constraint which specifies that it is to be authenticated only when the unblocking command restricts unblocking of the new domain to a specific electronic device, for example identified by a particular device ID. For example the unblocking command may need to specify a unique identifier of the device itself in order to be authenticated.

This approach can be useful since a party associated with an earlier domain in the hierarchy of trust may wish to impose measures which ensure that an descendant domain cannot authenticate the creation of further domains in an unlimited number of devices. For example, after initially authorising a given party to act as an authenticating body within the trust, the root certifying authority may subsequently find that that party has not been behaving responsibly and has been authorising commands without applying the requisite degree of security checks, and so may wish to revoke that party's ability to establish new cryptographic identities. By requiring that new domains are installed in a blocked state, this can allow further checks to be imposed when the unblocking command is issued. For example, authentication of the unblocking command may require that the electronic device contacts a server or other device, or provides an unblocking code which verifies that the unblocking has been authenticated by the server for instance, which provides a means of limiting the further creation of domains if necessary. Also, by making the unblocking commands specific to a particular electronic device this can prevent cryptographic data being copied from one device to another in order to circumvent possible security protections.

Hence, by providing a mechanism for such blocking and unblocking constraints to be injected at lower levels of the tree under control of a higher domain, this enables the higher domain to securely control the way in which messages which are not signed by itself are authenticated.

Another type of future constraint could specify which types of command are allowed to be authenticated by a given target domain or a descendant domain. For example, some domains may simply not be allowed to authorise a certain type of command and this may be specified by the future constraint so that those constraints are injected into the constraint set 80 of domains at subsequent levels of the tree, even when those subsequent domains are being authenticated outside the immediate control of the domain setting the future constraint.

Another type of future constraint may specify a conditional constraint which is to be satisfied by a given command if at least one other predetermined constraint is also to be satisfied by the command. Hence, whether the constraint is imposed may depend on what other constraints are applied. For example, a given conditional constraint could specify that if a given descendant domain imposes a particular cryptographic algorithm (e.g. SHA), then an additional constraint should also be imposed that the cryptographic information for that process should have a version date which is newer than a certain date or has been updated within a certain period. By providing the ability to specify conditional constraints the authenticating domain at a given level of tree can control more detailed processes which might optionally be applied by subsequent descendant domains but need not impose those constraints on other commands if they are not going to be subjected to those related constraints.

Another option is for the future constraint set to specify at least one default constraint which is to be satisfied by a command unless it is overruled by another constraint. Hence, the future constraints could be used to provide a safeguard option in case a descendant domain is not already applying some form of constraint. For example, the default may specify that commands with a signature older than a certain date should be rejected unless the descendant domain is already imposing a different cut off date, to guard against certain domains not imposing any cut off date at all.

In some cases a constraint applied may not only affect the commands being authenticated by a given domain but also affect other operations performed by the electronic device 2. For example, a future constraint could specify a device mode constraint which specifies that a command is to be authenticated only if the electronic device is operating in a predetermined mode of operation. For example, some devices may have a mode of operation associated with a certain cryptographic protocol which guarantees certain security requirements will be met and so some commands may be authenticated only if the device is operating in that mode. In this case, authentication of the command may therefore require the device to switch to that mode, and this may then affect other operations being performed by the device (not only the operation associated with the command that was authenticated). Hence, the authenticating domain can set constraints which affect the device as a whole and while the mechanism for ensuring that they are acted upon is invoked when a command is being authenticated by a given descendant domain, this may not be the only operation which is affected by the imposing of that constraint.

Hence, there are a wide range of future constraints which could be set. Similarly, any of the types of constraints described above could also be set as the target domain's own constraints 72 in a given configuration command 60, to set the constraints imposed for commands authenticated by that domain directly.

The above examples show a case where a domain configuration command for configuring a target domain is authenticated by an authenticating domain, where the target domain is a descendant of the authenticating domain. However, the technique of combining future constraints can also be used for cases where a domain configuration command for configuring a target domain is authenticated by the target domain itself (that is, where the target domain is the same as the authenticating domain). In this case, it can still be useful for one or more future constraints specified by the authenticating (target) domain to be combined with the constraints specified in the domain configuration command, to generate the combined set of zero, one or more constraints which are stored as part of the configuration data defining the authenticating/target domain. As the future constraints may have been derived from earlier future constraints set by earlier ancestor domains (e.g. see the example in FIG. 6 where the future constraints X, Y for the level 2 domain 50-2 ultimately derived from the root domain 50-0), combining future constraints with constraints from the domain configuration command even when the command is authenticated by the target domain itself helps to implement the "trickling down" of constraints through the delegated chain of trust, in the same way as the example discussed above where the target domain is a descendant of the authenticating domain. In some embodiments which allow a target domain to authenticate its own configuration commands, separate future constraint sets may be defined for a given domain, one to be applied when authenticating a command targeting that domain itself, and another to be applied when authenticating commands for configuring a descendant domain. This can be useful since not all the future constraints which are to be applied to descendant domains may be required for the authenticating domain itself.

In some embodiments, the method of FIG. 5 can be controlled by a computer program stored in the memory 6 which is executed on a general purpose processor 4 in the electronic device 1. In other embodiments, an electronic device 2 can have a piece of dedicated hardware for performing at least part of the authentication process. Some implementations may use a combined hardware-software approach where some parts of the process are handled by dedicated hardware (e.g. the authenticating step, or the combining of the future constraints) while other parts are done in software on a general purpose processor.

Hence, an electronic device may comprise authentication circuitry which receives a domain configuration command requesting configuration of a target domain of a hierarchical chain of trust on the electronic device, and authenticates the domain configuration command based on a cryptographic identity provided by an authenticating domain, and when the domain configuration command is authenticated, combines at least one target domain constraint specified by the domain configuration command and at least one future constraint specified by the authenticating domain to generate a combined constraint set comprising zero, one or more constraints to be satisfied by commands to be authenticated by the target domain, and stores an indication of said combined constraint set. The authentication circuitry could be the general purpose processor 4 acting under control of software, or a piece of dedicated authentication hardware, or a mixture of both (e.g. some dedicated hardware for performing some parts of the process as well as general purpose software-controlled processing circuitry for performing other parts of the process).

In summary, the technique described herein allows a given domain of a hierarchical chain of trust to inject additional constraints into the constraints that are used by descendant domains to verify the authenticity of commands, to provide greater security while still permitting the flexibility of delegating responsibilities to other parties which would not be possible in a top down approach where all the constraints used by all subsequent levels are known to the top level domain.

For at least one type of constraint, the combined constraint set may comprise said at least one type of constraint when at least one of said at least one target domain constraint and said at least one future constraint specifies said at least one type of constraint.

For at least one type of constraint, the combined constraint set may comprise said at least one type of constraint when both said at least one target domain constraint and said at least one future constraint specify said at least one type of constraint.

For at least one type of constraint, the combined constraint set may comprise said at least one type of constraint when said at least one type of constraint is specified exclusively by one of said at least one target domain constraint and said at least one future constraint.

For at least one type of constraint, the combined future constraint set may comprise said at least one type of constraint when said at least one type of constraint is specified by said at least one target domain constraint but is not specified by said at least one future constraint.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A method for configuring, in an electronic device, a target domain of a hierarchical chain of trust, the target domain providing a cryptographic identity for authenticating commands to be executed by the electronic device, the method comprising:
   receiving a domain configuration command requesting configuration of the target domain on the electronic device, the domain configuration command specifying at least one target domain constraint to be satisfied by commands to be authenticated by the target domain and at least one target domain future constraint to be combined with other constraints when configuring a descendant domain of the target domain;
   authenticating the domain configuration command based on a cryptographic identity provided by an authenticating domain, wherein the target domain is the authenticating domain or a descendant domain of the authenticating domain in the hierarchical chain of trust; and
   when the domain configuration command is authenticated:
   combining, using one or more logical functions, said at least one target domain constraint and at least one future constraint specified by the authenticating domain to generate a combined constraint set comprising zero, one or more constraints to be satisfied by commands to be authenticated by the target domain, and storing an indication of said combined constraint set, and
   combining, using one or more logical functions, said at least one target domain future constraint and said at least one future constraint specified by the authenticating domain to generate a combined target domain future constraint set comprising zero, one or more constraints to be combined with other constraints when configuring a descendant domain of the target domain, and storing an indication of said combined target domain future constraint set,
   wherein the target domain constraint refers to one or more requirements to be satisfied by a command in order to be authenticated, and
   wherein the future constraint refers to one or more requirements to be satisfied by a command authenticated by one or more descendant domains of the authenticating domain.

2. The method of claim 1, wherein subsequent commands to be authenticated by the target domain which are received following configuration of the target domain are authenticated based on whether they satisfy the combined constraint set.

3. The method of claim 1, comprising, in response to the domain configuration command being authenticated, storing an indication of at least one target domain future constraint for combining with other constraints when configuring a descendant domain of the target domain.

4. The method of claim 3, wherein said at least one target domain future constraint is selected in dependence on at least one of:
   said at least one authenticating domain future constraint; and
   at least one target domain future constraint specified by the domain configuration command.

5. The method of claim 1, wherein a same type of command is subject to different sets of constraints depending on the level of the hierarchical chain of trust at which the command is to be authenticated.

6. The method of claim 1, wherein said at least one future constraint comprises at least one descendant constraint to be satisfied by commands to be authenticated by the target domain and any descendant domain of the target domain in the hierarchical chain of trust.

7. The method of claim 1, wherein said at least one future constraint comprises at least one level-specific constraint to be satisfied by commands to be authenticated by a domain at one or more predetermined levels of the hierarchical chain of trust.

8. The method of claim 1, wherein said at least one future constraint comprises at least one type-specific constraint to be satisfied for one or more predetermined types of command to be authenticated by the target domain or a descendant domain of the target domain.

9. The method of claim 1, wherein said at least one future constraint comprises at least one type-restricting constraint specifying which types of command are allowed to be authenticated by the target domain or a descendant domain of the target domain.

10. The method of claim 1, wherein said at least one future constraint comprises at least one conditional constraint to be satisfied by the command if at least one predetermined constraint is also to be satisfied by the command.

11. The method of claim 1, wherein said at least one future constraint comprises at least one default constraint to be satisfied by the command unless overruled by another constraint.

12. The method of claim 1, wherein said at least one future constraint comprises at least one device mode constraint specifying that a command is to be authenticated only if the electronic device is operating in a predetermined mode of operation.

13. The method of claim 1, wherein said at least one future constraint comprises a blocking constraint specifying that a domain install command for installing a new domain of the hierarchical chain of trust on the electronic device is to be authenticated by the target domain or a descendant domain of the target domain only when the domain install command specifies that the new domain is to be installed in a blocked state in which the new domain cannot authenticate commands.

14. The method of claim 13, wherein the new domain is unblocked in response to a unblocking command.

15. The method of claim 14, wherein said at least one future constraint comprises an unblocking constraint specifying that the unblocking command is to be authenticated by the target domain or the descendant domain of the target domain only when the unblocking command restricts unblocking of the new domain to a specific electronic device.

16. The method of claim 1, wherein the command to be authenticated specifies a digital signature and signature metadata identifying which portions of the command are authenticated by the digital signature; and said future constraint comprises a signature enforcing constraint specifying that a command is to be authenticated by the target domain or a descendant domain of the target domain only when the signature metadata specifies that all of the portions of the command are authenticated by the digital signature.

17. The method of claim 1, wherein the domain configuration command comprises one of:

a domain install command requesting installation of the target domain on the electronic device; and a domain update command requesting updating of parameters of the target domain on the electronic device.

18. A non-transitory storage medium storing a computer program comprising program instructions to control an electronic device to:

receive a domain configuration command requesting configuration of a target domain of a hierarchical chain of trust on the electronic device, the target domain providing a cryptographic identity for authenticating commands to be executed by the electronic device, and the domain configuration command specifying at least one target domain constraint to be satisfied by commands to be authenticated by the target domain and at least one target domain future constraint to be combined with other constraints when configuring a descendant domain of the target domain;

authenticate the domain configuration command based on a cryptographic identity provided by an authenticating domain, wherein the target domain is the authenticating domain or a descendant domain of the authenticating domain in the hierarchical chain of trust; and when the domain configuration command is authenticated:

combine, using one or more logical functions, said at least one target domain constraint and at least one future constraint specified by the authenticating domain to generate a combined constraint set comprising zero, one or more constraints to be satisfied by commands to be authenticated by the target domain, and storing an indication of said combined constraint set, and combine, using one or more logical functions, said at least one target domain future constraint and said at least one future constraint specified by the authenticating domain to generate a combined target domain future constraint set comprising zero, one or more constraints to be combined with other constraints when configuring a descendant domain of the target domain, and storing an indication of said combined target domain future constraint set, wherein the target domain constraint refers to one or more requirements to be satisfied by a command in order to be authenticated, and wherein the future constraint refers to one or more requirements to be satisfied by a command authenticated by one or more descendant domains of the authenticating domain.

19. An electronic device comprising:

the non-transitory storage medium of claim 18, and processing circuitry configured to execute the computer program stored on the non-transitory storage medium.

20. An electronic device comprising:

authentication circuitry configured to receive a domain configuration command requesting configuration of a target domain of a hierarchical chain of trust on the electronic device, the target domain providing a cryptographic identity for authenticating commands to be executed by the electronic device, the domain configuration command specifying at least one target domain constraint to be satisfied by commands to be authenticated by the target domain and at least one target domain future constraint to be combined with other constraints when configuring a descendant domain of the target domain, and to authenticate the domain configuration command based on a cryptographic identity provided by an authenticating domain, wherein the target domain is the authenticating domain or a descendant domain of the authenticating domain in the hierarchical chain of trust;

wherein when the domain configuration command is authenticated, the authentication circuitry is configured to:

combine, using one or more logical functions, said at least one target domain constraint and at least one future constraint specified by the authenticating domain to generate a combined constraint set comprising zero, one or more constraints to be satisfied by commands to be authenticated by the target domain, and to store an indication of said combined constraint set, and combine, using one or more logical functions, said at least one target domain future constraint and said at least one future constraint specified by the authenticating domain to generate a combined target domain future constraint set comprising zero, one or more constraints to be combined with other constraints when configuring a descendant domain of the target domain, and storing an indication of said combined target domain future constraint set, wherein the target domain constraint refers to one or more requirements to be satisfied by a command in order to be authenticated, and wherein the future constraint refers to one or more requirements to be satisfied by a command authenticated by one or more descendant domains of the authenticating domain.

* * * * *